United States Patent
Ravikumar et al.

(10) Patent No.: US 10,144,877 B2
(45) Date of Patent: Dec. 4, 2018

(54) SMALL SCALE MODULAR GAS TO LIQUIDS PLANT FOR STRANDED REMOTE GAS

(71) Applicant: Fluor Technologies Corporation, Sugar Land, TX (US)

(72) Inventors: Ravi Ravikumar, Lancaster, CA (US); Paul Koppel, Houston, TX (US); Sanjiv Dabee, Aliso Viejo, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 231 days.

(21) Appl. No.: 15/011,717

(22) Filed: Feb. 1, 2016

(65) Prior Publication Data

US 2017/0218279 A1 Aug. 3, 2017

(51) Int. Cl.
*C10G 2/00* (2006.01)
*C09K 8/592* (2006.01)
(Continued)

(52) U.S. Cl.
CPC .................. *C10G 2/32* (2013.01); *C01B 3/40* (2013.01); *C09K 8/58* (2013.01); *C09K 8/592* (2013.01);
(Continued)

(58) Field of Classification Search
CPC .......... C10G 45/58; C10G 2/32; C10G 67/00; C10G 49/00; C10G 47/00; C10G 5/00;
(Continued)

(56) References Cited

U.S. PATENT DOCUMENTS 8,425,760 B2 4/2013 Lenglet et al.
2002/0006968 A1* 1/2002 Abbott .................. B01J 8/0496
518/704
(Continued)

FOREIGN PATENT DOCUMENTS

WO WO2017135981 A1 8/2017

OTHER PUBLICATIONS

PCT Application No. PCT/US2016/032298, International Search Report and Written Opinion, dated Oct. 21, 2016, 17 pages.
(Continued)

*Primary Examiner* — Jafar F Parsa
(74) *Attorney, Agent, or Firm* — Conley Rose, PC (57) ABSTRACT

A method of processing stranded remote gas comprising (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1; (b) introducing at least a portion of the syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C.; and (c) blending the FT syncrude product with crude oil for storage and/or transport.

29 Claims, 1 Drawing Sheet

(51) Int. Cl.
*C09K 8/66* (2006.01)
*E21B 43/26* (2006.01)
*C09K 8/58* (2006.01)
*E21B 43/20* (2006.01)
*E21B 43/24* (2006.01)
*C01B 3/40* (2006.01)

(52) U.S. Cl.
CPC ............... *C09K 8/66* (2013.01); *E21B 43/20* (2013.01); *E21B 43/24* (2013.01); *E21B 43/26* (2013.01); *C01B 2203/062* (2013.01); *C01B 2203/1058* (2013.01)

(58) Field of Classification Search
CPC .... C10G 2300/4037; C10G 2300/4062; C10G 2300/1025; C01B 2203/0233; C01B 2203/04; C01B 2203/0405; C01B 2203/0455; C01B 2203/0485; C01B 2203/062; C01B 2203/1052; C01B 2203/1276
See application file for complete search history.

(56) References Cited

U.S. PATENT DOCUMENTS

| | | |
|---|---|---|
| 2005/0106086 A1 | 5/2005 | Tomlimson et al. |
| 2006/0135629 A1 | 6/2006 | Abbott et al. |
| 2006/0231252 A1* | 10/2006 | Shaw ...................... C01B 3/382 166/272.3 |
| 2010/0186824 A1* | 7/2010 | Bowe ......................... B01J 8/02 137/2 |
| 2011/0130474 A1 | 6/2011 | Moon et al. |
| 2014/0142204 A1* | 5/2014 | Kibby .................... C10G 45/02 518/702 |
| 2015/0014222 A1 | 1/2015 | Tessel |
| 2016/0369173 A1* | 12/2016 | Kwon ..................... C10G 45/58 |

OTHER PUBLICATIONS

Foreign Communication from a Related Counterpart—International Search Report and Written Opinion, dated Aug. 7, 2018, PCT/US2016/032298, filed on May 13, 2016.

* cited by examiner

SMALL SCALE MODULAR GAS TO LIQUIDS PLANT FOR STRANDED REMOTE GAS

TECHNICAL FIELD

The present disclosure relates to methods of processing stranded remote gas, more specifically methods of producing liquid hydrocarbons from stranded remote gas, for example by producing synthesis gas (syngas) from the stranded remote gas and converting the syngas to liquid hydrocarbons.

BACKGROUND

Natural gas is a naturally occurring combustible mixture of hydrocarbons, consisting primarily of methane. Natural gas is a versatile, clean-burning, and efficient fuel that is used in a wide variety of applications, such as household heating and cooking, as well as electric power generation and for producing a variety of chemicals in the industrial sector, such as for example synthesis gas (syngas). Syngas is a mixture comprising of carbon monoxide and hydrogen, and some carbon dioxide. Syngas is widely used in industrial settings, either for electricity generation or as an intermediate in the production of synthetic natural gas (SNG), hydrogen, ammonia, methanol, and liquid hydrocarbons, for example via a Fischer-Tropsch process. Natural gas reserves are plentiful around the world, but many are too small or too remote from sizable population centers to be developed economically. Stranded remote gas is essentially gas that is wasted or unused. Estimates of stranded remote gas reserves range from 40% to 60% of the world's proven natural gas reserves. Oil production facilities can also generate natural gas, and such natural gas can be qualified as stranded remote gas. Generally, stranded remote gas from oil production facilities is flared, posing an environmental issue. Thus, there is an ongoing need for the development of methods of processing stranded remote gas.

BRIEF SUMMARY

Disclosed herein is a method of processing stranded remote gas comprising (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1, (b) introducing at least a portion of the syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C., and (c) blending the FT syncrude product with crude oil for storage and/or transport.

Further disclosed herein is a method of processing stranded remote gas comprising (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1, (b) introducing at least a portion of the syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C., and (c) introducing at least a portion of the FT water to a wellbore for enhanced oil recovery.

Also disclosed herein is a method of processing stranded remote gas comprising (a) setting up at least one modular system for processing stranded remote gas at a wellbore site, wherein each modular system comprises a pre-reforming unit, a reforming unit, and a Fischer-Tropsch (FT) unit, (b) introducing stranded remote gas and steam to the reforming unit to produce synthesis gas (syngas), wherein the stranded remote gas is recovered at the wellbore site, wherein the stranded remote gas comprises methane, carbon dioxide, and sulfur-containing compounds, and wherein the syngas is characterized by a molar ratio of hydrogen to carbon monoxide of from about 1.7:1 to about 2.5:1, (c) introducing at least a portion of the syngas to the FT unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C., (d) introducing at least a portion of the FT water to a wellbore for oil recovery, (e) recovering a crude oil from the wellbore, (f) blending the FT syncrude product with the crude oil, wherein the FT syncrude product is miscible with the crude oil, (g) introducing at least a portion of the FT tail gas and steam to the pre-reforming unit to produce hydrogenated hydrocarbons, wherein the FT tail gas comprises olefins, unreacted syngas, and carbon dioxide, wherein the unreacted syngas comprises carbon monoxide and hydrogen, and wherein at least a portion of the olefins react with at least a portion of the hydrogen to produce the hydrogenated hydrocarbons, and (h) introducing at least a portion of the hydrogenated hydrocarbons to the reforming unit.

Also disclosed herein is a method of processing stranded remote gas comprising (a) introducing raw stranded remote gas to a bulk sulfur removal unit to produce stranded remote gas, wherein the stranded remote gas comprises methane, carbon dioxide, and sulfur-containing compounds, and wherein the stranded remote gas comprises sulfur in an amount of less than about 100 ppmv, (b) introducing at least a portion of the stranded remote gas and steam to a reforming unit to produce synthesis gas (syngas), wherein the syngas is characterized by a molar ratio of hydrogen to carbon monoxide of from about 1.7:1 to about 2.5:1, (c) introducing at least a portion of the syngas to a cooling unit to produce a cooled syngas, (d) introducing at least a portion of the cooled syngas to a compressing unit to produce a compressed syngas, (e) introducing at least a portion of the compressed syngas to a washing unit to produce a washed syngas, (f) introducing at least a portion of the washed syngas to a trim sulfur removal unit to produce a purified syngas, (g) introducing at least a portion of the purified syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C., (h) introducing at least a portion of the FT water to a wellbore for oil recovery, and (i) blending the FT syncrude product with crude oil produced for storage and/or transport.

BRIEF DESCRIPTION OF THE DRAWINGS

For a detailed description of the preferred embodiments of the disclosed methods, reference will now be made to the accompanying drawing in which.

DETAILED DESCRIPTION

Disclosed herein are methods of processing stranded remote gas comprising (a) setting up at least one modular system for processing stranded remote gas at a wellbore site, wherein each modular system comprises a first sulfur removal unit (e.g., bulk sulfur removal unit) for sulfur removal to a level of from about 5 parts per million volume (ppmv) to about 100 ppmv total sulfur, a pre-reforming unit for FT tail gas, a reforming unit with a sulfur passivated nickel-based catalyst, a cooling unit, a compressing unit, a washing unit, a second sulfur removal unit (e.g., trim sulfur removal unit), and a Fischer-Tropsch (FT) unit; (b) introducing a raw stranded remote gas (e.g., untreated stranded remote gas) to the bulk sulfur removal unit for removal of sulfur from the raw stranded remote gas to produce a stranded remote gas (e.g., treated stranded remote gas), wherein the raw stranded remote gas is recovered at the wellbore site, wherein the raw stranded remote gas comprises methane and small amounts of higher hydrocarbons (e.g., ethane, propane, butane and pentanes), carbon dioxide, and sulfur-containing compounds, wherein the raw stranded remote gas can comprise sulfur in an amount of greater than about 100 ppmv, wherein the stranded remote gas comprises methane and small amounts of higher hydrocarbons, carbon dioxide, and sulfur-containing compounds, and wherein the stranded remote gas can comprise sulfur in an amount of from about 5 ppmv to about 100 ppmv; (c) introducing at least a portion of the stranded remote gas and steam to the reforming unit comprising a sulfur passivated nickel-based catalyst to produce synthesis gas (syngas), wherein the syngas comprises carbon monoxide and hydrogen, and wherein the syngas is characterized by a molar ratio of hydrogen to carbon monoxide of from about 1.7:1 to about 2.5:1; (d) introducing at least a portion of the syngas to the cooling unit to produce a cooled syngas; (e) introducing at least a portion of the cooled syngas to the compressing unit to produce a compressed syngas; (f) introducing at least a portion of the compressed syngas to the washing unit to produce a washed syngas (e.g., ammonia free washed syngas, washed compressed syngas); (g) introducing at least a portion of the washed syngas (e.g., ammonia free washed syngas, washed compressed syngas) to the trim sulfur removal unit to produce a purified syngas; (h) introducing at least a portion of the purified syngas to the FT unit to produce an FT syncrude product, FT water, and FT tail gas, wherein the syncrude product comprises FT hydrocarbon liquids, wherein the FT syncrude product comprises FT wax in an amount of less than about 20 weight % (wt. %), or alternatively from about 5 wt. % to about 20 wt. %, and wherein the FT unit is characterized by an FT reaction temperature of from about 300° C. to about 350° C.; (i) introducing at least a portion of the FT water to a wellbore for oil recovery; (j) recovering a crude oil from the wellbore; (k) blending the FT syncrude product with the crude oil, wherein the FT syncrude product is fungible with the crude oil; (l) introducing at least a portion of the FT tail gas and steam to the pre-reforming unit to produce hydrogenated hydrocarbons, wherein the FT tail gas comprises hydrocarbons such as olefins, unreacted syngas (e.g., $H_2$ and CO), and carbon dioxide ($CO_2$), wherein the unreacted syngas comprises carbon monoxide and hydrogen, and wherein at least a portion of the olefins react with at least a portion of the hydrogen to produce the hydrogenated hydrocarbons; (m) introducing at, least a portion of the hydrogenated hydrocarbons to the reforming unit; (n) introducing at least a portion of the FT tail gas containing hydrocarbons, $H_2$, CO, and $CO_2$ to the reforming unit, wherein the FT tail gas is utilized as fuel in the reforming unit; and (o) introducing a portion of the FT tail gas containing $H_2$ to the bulk sulfur removal unit (e.g., raw stranded remote gas sulfur removal unit). In an embodiment, one modular system can produce from about 750 barrels/day to about 1,250 barrels/day FT syncrude product.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosed subject matter otherwise claimed. No language in the specification should be construed as indicating any non-claimed element essential to the practice of the disclosed subject matter.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

As used herein, the terms "comprise," "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures preceded by "comprises [ . . . ] a" does not, without more constraints, preclude the existence of other devices or other sub-systems or other elements or other structures or additional devices or additional sub-systems or additional elements or additional structures.

Reference throughout this specification to "one embodiment," "an embodiment," or similar language means that a particular feature, structure, or characteristic described in connection with the embodiment is included in at least one embodiment of the present disclosure. Thus, appearances of the phrase "in one embodiment," "in an embodiment," and similar language throughout this detailed description may, but do not necessarily, all refer to the same embodiment.

The following discussion provides many exemplary embodiments of the disclosed subject matter. Although each embodiment may represent a single combination of disclosed elements, the disclosed subject matter is considered to include all possible combinations of the disclosed elements. Thus, if one embodiment comprises elements A, B, and C, and a second embodiment comprises elements B and D, then the disclosed subject matter is also considered to include other remaining combinations of A, B, C, or D, even if not explicitly disclosed.

In an embodiment, a method of processing stranded remote gas can comprise setting up (e.g., assembling) at least one modular system for processing stranded remote gas at a wellbore site (e.g., oil wellbore site), wherein each modular system can comprise a first sulfur removal unit (e.g., bulk sulfur removal unit) to remove sulfur to a level of from about 5 ppmv to about 100 ppmv total sulfur in the stranded remote gas; a pre-reforming unit; a reforming unit with sulfur passivated nickel-based catalyst to enable operation with a low steam to carbon ratio in the feed gas without the risk of carbon formation; a cooling unit; a compressing unit; a washing unit; a second sulfur removal unit (e.g., a trim sulfur removal unit; and a Fischer-Tropsch unit. That is, a given modular system may comprise a plurality of units, e.g., a bulk sulfur removal unit, a pre-reforming unit, a reforming unit, a cooling unit, a compressing unit, a washing unit, a trim sulfur removal unit, and a Fischer-Tropsch (FT) unit. Furthermore, a plurality of modular systems may be combined in a spread or array to provide cumulative processing/production capacity over a single modular system. While the current disclosure will be discussed in detail in the context of setting up from 1 to about 4 modular systems, it should be understood that any suitable number of modular systems could be set up and employed at a particular location, such as for example one, two, three, four, five, six, seven, eight, nine, ten, or more modular systems could be set up and employed at a particular location.

In an embodiment, setting up at least one modular system for processing stranded remote gas at a wellbore site can comprise transporting each unit of the modular system to the wellbore site, wherein each unit can be transported concurrently, sequentially, or combinations thereof, with respect to the other units. Accordingly, each unit will be sized and configured for ease of transport to the wellsite. For example, a unit for service at terrestrial sites may be sized and configured for overland transport (e.g., placed on a trailer or skid) as a standard or oversize tractor-trailer transport. A unit for service at offshore sites may be sized and configured for ship transport (e.g., placed on a barge or skid). Each unit can be optionally stored at the wellbore site, as necessary. Each unit can be placed and/or positioned at the wellsite in a cooperative structural arrangement or position (including at various elevations, if needed for example to facilitate gravity flow).

In an embodiment, setting up at least one modular system for processing stranded remote gas at a wellbore site can comprise connecting (e.g., providing fluid communication among) each unit of the modular system with any other suitable unit through any suitable conduits (e.g., pipes, streams, etc.), as well as connecting each unit with any necessary inflow streams and/or outflow streams, such as for example, power (electrical, hydraulic, mechanical/shaft-drive, etc.), water, cooling water, steam, fuel, flue gas (e.g., exhaust gas) outlet, stranded remote gas inlet, FT syncrude outlet, etc.

In an embodiment, one modular system can produce from about 750 barrels/day to about 1,250 barrels/day, alternatively from about 800 barrels/day to about 1,200 barrels/day, or alternatively from about 900 barrels/day to about 1,100 barrels/day FT syncrude product, wherein the FT syncrude product comprises FT hydrocarbon liquids, as will be discussed in more detail later herein.

In an embodiment, the at least one modular system comprises a plurality of modular systems forming a spread or array comprising from 1 to about 2, alternatively from 1 to about 3, or alternatively from 1 to about 4 modular systems. As will be appreciated by one of skill in the art, and with the help of this disclosure, any suitable number of modular systems can be used to form a suitable spread or array, and the number of modular systems is dependent on the amount of stranded remote gas available for processing at a given wellsite and/or geographically identified production site. For example, a spread comprising 4 modular systems could be set up and processing stranded remote gas at a given production site while the associated gas reserves produce at peak levels, and later on, as the associated gas production declines, 1, 2, or 3 of the modular systems could be disassembled (e.g., taken apart), and 3, 2, or 1 of the modular systems, respectively, could remain assembled and functional, continuing to process the available stranded remote gas, based on the amount of stranded remote gas available for processing at the given production site. Accordingly, as gas production declines over time, fewer modular systems may be employed, with each operating at a higher total throughput and reduced total operating costs to improve overall gas recovery economics.

In an embodiment, one or more modular systems of the spread can be disassembled (e.g., taken apart into individual units and moved to an alternative location) when the production of the given modular system to be disassembled produces less than about 750 barrels/day, alternatively less than about 500 barrels/day, or alternatively less than about 400 barrels/day FT syncrude product. As will be appreciated by one of skill in the art, and with the help of this disclosure, the amount of FT syncrude product produced by one modular system is dependent upon the amount of stranded remote gas introduced to that particular modular system.

In an embodiment, disassembling one or more modular systems for processing stranded remote gas at a wellbore site can comprise disconnecting each unit from any other units, for example by disconnecting any suitable conduits (e.g., pipes, streams, etc.), as well as disconnecting each unit from any inflow streams and/or outflow streams, such as for example, water, cooling water, steam, fuel, flue gas (e.g., exhaust gas) outlet, stranded remote gas inlet, FT syncrude outlet, etc.

In an embodiment, individual units of one or more disassembled modular systems can be moved (e.g., transported) to another wellbore site for processing stranded remote gas recovered at the another wellbore site. Each unit can be transported concurrently, sequentially, or combinations thereof, with respect to the other units. Each unit can be optionally stored at the another wellbore site, as necessary, and could be placed on its location where it will be operating from. In such embodiment, the one or more disassembled modular systems can be set up at the another wellbore site as previously described herein.

In an embodiment, a method of processing stranded remote gas can comprise introducing a raw stranded remote gas to a first sulfur removal unit (e.g., bulk sulfur removal unit) for sulfur removal to a level of from about 5 ppmv to about 100 ppmv total sulfur, wherein the raw stranded remote gas can be recovered at the wellbore site. The raw stranded remote gas at a wellbore site, which is a gas produced as a byproduct of the production of crude oil, can be referred to as "associated gas." For purposes of the disclosure herein, the terms "raw stranded remote gas" and "associated gas" can be used interchangeably and refer to natural gas that is available for processing at a wellbore site. Generally, associated gas reserves become available with production of crude oil at a wellbore site, wherein the wellbore site is developed for the production of crude oil. The associated gas reserves typically produce at peak levels for a few years and then decline. Conventionally, associated gas is generally regarded as an undesirable byproduct, which is either reinjected, flared, or vented.

In an embodiment, the raw stranded remote gas can comprise methane, carbon dioxide, and contaminants such as sulfur-containing compounds and chlorides. In an embodiment, the raw stranded remote gas can further comprise small amounts of hydrocarbons other than methane (e.g., higher hydrocarbons), such as ethane, propane, butane and pentanes; as well as water vapor and nitrogen. In an embodiment, the sulfur-containing compounds of the raw stranded remote gas can comprise hydrogen sulfide, carbon sulfide, carbonyl sulfide, carbon disulfide, organic sulfur compounds, and the like, or combinations thereof. In an embodiment, the sulfur-containing compounds of the raw stranded remote gas can comprise hydrogen sulfide.

In an embodiment, the raw stranded remote gas (e.g., untreated stranded remote gas) can be introduced to the bulk sulfur removal unit for removal of sulfur from the raw stranded remote gas to produce a stranded remote gas (e.g., treated stranded remote gas). In an embodiment, the raw stranded remote gas can comprise sulfur in an amount of greater than about 100 ppmv, alternatively greater than about 500 ppmv, or alternatively greater than about 1,000 ppmv. In an embodiment, the bulk sulfur removal unit can comprise (i) a hydrogenation catalyst system comprising or consisting of a cobalt molybdenum catalyst to convert at least a portion of the sulfur-containing compounds of the raw stranded remote gas to hydrogen sulfide ($H_2S$); and (ii) zinc oxide for bulk sulfur capture. In an embodiment, the raw stranded remote gas (e.g., untreated stranded remote gas) and a portion of FT tail gas comprising hydrogen ($H_2$) can be introduced to the bulk sulfur removal unit, wherein at least a portion of the hydrogen of the FT tail gas can hydrogenate at least a portion of the sulfur-containing compounds of the raw stranded remote gas to hydrogen sulfide in the presence of the hydrogenation catalyst system.

In an embodiment, a stranded remote gas (e.g., treated stranded remote gas) can be recovered from the bulk sulfur removal unit, and can be blended with a portion of the FT tail gas processed in a pre-reformer (as will be described in more detail later herein), wherein the FT tail gas processed in the pre-reformer comprises the balance of the FT tail gas used as reformer fuel and for raw stranded natural gas sulfur removal in the bulk sulfur removal unit (e.g., the FT tail gas processed in the pre-reformer comprises the FT tail gas that was not used as reformer fuel and for raw stranded natural gas sulfur removal in the bulk sulfur removal unit).

In an embodiment, the stranded remote gas (e.g., treated stranded remote gas) can comprise methane and small amounts of higher hydrocarbons (e.g., ethane, propane, butane, and pentanes), carbon dioxide, and contaminants such as sulfur-containing compounds and chlorides. In an embodiment, the stranded remote gas can comprise sulfur in an amount of less than about 100 ppmv, alternatively from about 5 ppmv to about 100 ppmv, alternatively from about 10 ppmv to about 90 ppmv, or alternatively from about 25 ppmv to about 75 ppmv. In an embodiment, the sulfur-containing compounds of the stranded remote gas can comprise hydrogen sulfide.

In an embodiment, a method of processing stranded remote gas can comprise introducing at least a portion of the stranded remote gas and steam to the reforming unit comprising a sulfur passivated nickel-based catalyst to produce a reformed gas also known as synthesis gas (syngas) with a low $H_2/CO$ molar ratio (e.g., with a $H_2/CO$ molar ratio of about 2:1), wherein the syngas can comprise carbon monoxide and hydrogen.

In an embodiment, the stranded remote gas can comprise sulfur in an amount of less than about 100 ppmv. As will be appreciated by one of skill in the art, and with the help of this disclosure, the bulk of sulfur-containing compounds are removed from the raw stranded remote gas to produce the stranded remote gas; however, there are sulfur-containing compounds present in the stranded remote gas, and it is not necessary to remove such residual sulfur-containing compounds present in the stranded remote gas.

Generally, in conventional reforming processes, at least a portion of the sulfur-containing compounds can be separated (e.g., removed) from a feedstock introduced to a reforming unit, as the sulfur-containing compounds could poison the catalyst in the reforming unit. In an embodiment, the stranded remote gas feed to the reforming unit is considered a sour gas (e.g., sour natural gas) based upon the presence of acid gases such as hydrogen sulfide, carbon dioxide, etc. The stranded remote gas can further comprise ammonia. In an embodiment, the stranded remote gas feed to the reforming unit can comprise hydrogen sulfide in an amount ranging from about 5 ppmv to about 100 ppmv, alternatively from about 10 ppmv to about 90 ppmv, or alternatively from about 25 ppmv tip about 75 ppmv. The stranded remote gas feed to the reforming unit can comprise hydrogen sulfide due to the use of sulfur passivated nickel-based catalyst in the reformer. Further, the carbon dioxide ($CO_2$) in the stranded remote gas is beneficial in a reforming step as disclosed herein due to conversion of a portion of the $CO_2$ to FT reactant CO by reacting with excess $H_2$ in the reformed gas (e.g., syngas).

In various embodiments, steam may be introduced into the reformer as a component of the stranded gas feed stream (e.g., wet gas); as a component of an effluent stream from the pre-reforming unit; as a separate steam feed stream; by using a portion of an aqueous condensate from syngas cooling in a saturation unit for moisturizing the stranded remote gas after bulk sulfur removal; or combinations thereof. In an embodiment, a molar ratio of steam to carbon in hydrocarbons (e.g., methane, higher hydrocarbons, etc.) of the total feed streams to the reformer can be from about 0.65:1 to about 2.0:1, alternatively from about 0.65:1 to about 1.5:1, alternatively from about 0.8:1 to about 1.6:1, or alternatively from about 1.0:1 to about 2.0:1. In an embodiment, a molar ratio of carbon dioxide to carbon in hydrocarbons (e.g., methane, higher hydrocarbons, etc.) of the total feed streams to the reformer can be from about 0.4:1 to about 0.8:1, alternatively from about 0.45:1 to about 0.75:1, or alternatively from about 0.5:1 to about 0.7:1. Methane can be reformed (e.g., converted to syngas) in the presence of water (e.g., steam) according to the general reaction $CH_4+H_2O \rightleftharpoons CO+3H_2$. Conventional steam methane reformers use a steam to methane molar ratio of from about 2.5:1 to about 3.5:1, resulting in a syngas with a molar ratio of hydrogen to carbon monoxide of about 3:1. In an embodiment, the reforming unit as disclosed herein can employ a low steam to methane ratio (when compared to conventional steam reforming processes), in order to produce a syngas having a molar ratio of hydrogen to carbon monoxide of about 2:1.

In various embodiments, carbon dioxide may be introduced into the reformer as a component of the stranded gas feed stream (e.g., an acid or sour gas) and/or as a component of an effluent stream from the pre-reforming unit. In an embodiment, a molar ratio of carbon dioxide to methane in the total feed streams to the reformer can be from about 0.4:1 to about 0.8:1, alternatively from about 0.45:1 to about 0.75:1, or alternatively from about 0.5:1 to about 0.7:1. In order to get a molar ratio of hydrogen to carbon monoxide of about 2:1, $CO_2$ recycle and $CO_2$ in a feedgas to the reformer is required. In an embodiment, a method of processing stranded remote gas excludes separating the carbon dioxide from the stranded remote gas and/or raw stranded remote gas prior to introducing the stranded remote gas to the reforming unit, due to $CO_2$ in the feedgas benefiting the production of a reformed gas (e.g., syngas) with a reduced $H_2/CO$ molar ratio (e.g., with a $H_2/CO$ molar ratio of about 2:1). Generally, in conventional reforming processes, at least a portion of the carbon dioxide can be separated (e.g., removed) from a feedstock introduced to a reforming unit, as the carbon dioxide lowers the molar ratio of hydrogen to carbon monoxide. Carbon dioxide can be converted to carbon monoxide in the presence of hydrogen, according to the general reaction $CO_2+H_2 \rightleftharpoons CO+H_2O$. In an embodiment, the reforming unit as disclosed herein can employ carbon dioxide as part of a feedstock introduced to a reforming unit (when compared to conventional steam reforming processes), in order to produce a syngas having a molar ratio of hydrogen to carbon monoxide of about 2:1. Further, the $CO_2$ in an FT tail gas feed to the reformer can be beneficial for reducing the $H_2/CO$ molar ratio in the reformed gas or syngas (e.g., a reduced $H_2/CO$ molar ratio of about 2:1). Converting carbon dioxide to carbon monoxide lowers the molar ratio of hydrogen to carbon monoxide both by consuming hydrogen and producing carbon monoxide. Further, the presence of carbon dioxide can lead to an additional methane reforming reaction as represented by the general reaction $CH_4+CO_2 \rightleftharpoons 2CO+2H_2$, which in turn can lower the molar ratio of hydrogen to carbon monoxide in the syngas by producing hydrogen and carbon monoxide in equimolar amounts.

In an embodiment, the reforming unit can comprise any suitable reactor, such as for example a tubular reactor, a multitubular reactor, and the like, or combinations thereof. In an embodiment, the reforming unit can comprise a MIDREX reformer, which is commercially available from Midrex Technologies, Inc.; or any generic tubular reactor with a sulfur passivated nickel-based catalyst.

In an embodiment, the reforming unit can comprise a nickel-based catalyst and/or a sulfur passivated nickel-based catalyst (to avoid carbon depositions). Methane reforming (according to the general reaction $CH_4+H_2O \rightleftharpoons CO+3H_2$) is strongly endothermic, and a reaction rate depends on the temperature, pressure and catalyst type. Methane will undergo the reforming reaction at high temperatures; however, in the presence of a catalyst (e.g., nickel-based catalyst), the temperature at which methane can be reformed can be lowered. In an embodiment, the reforming unit can comprise one or more catalyst filled tubes (e.g., nickel-based catalyst filled tubes). In an embodiment, methane reforming can take place in catalyst filled tubes (e.g., nickel-based catalyst filled tubes). In such embodiment, the catalyst filled tubes can be heated indirectly, such as for example by burning a fuel inside a reactor (e.g., fire box, furnace, etc.) comprising the catalyst filled tubes (e.g., a tube-filled furnace). In an embodiment, any suitable fuel can be used for heating the reforming unit. Non-limiting examples of fuels suitable for use in the present disclosure for heating the reforming unit include raw stranded remote gas, an FT tail gas, methane, propane, butane, waste gas, stranded remote gas after bulk sulfur removal, and the like, or combinations thereof. In an embodiment, a flue gas can be emitted from the reforming unit, wherein the flue gas comprises fuel combustion products, such as carbon dioxide and water vapor. In some embodiments, a fuel can be burned at a bottom of the reforming unit, and a flue gas can be vented or emitted at the top of the reforming unit, wherein furnace tubes filled with catalyst are dispersed within the furnace vessel between fuel burners and the flue gas vent/outlet. As will be appreciated by one of skill in the art, and with the help of this disclosure, the fuel burning (e.g., burner flames) and the fuel combustion products do not contact directly the stranded remote gas travelling through and reforming within the catalyst filled tubes (e.g., nickel-based catalyst filled tubes), the fuel burns inside the reforming unit and outside the catalyst filled tubes, and the fuel combustion products travel through the reforming unit and along an outer surface of the catalyst filled tubes towards an outlet for the flue gas.

In an embodiment, the stranded remote gas and steam can be introduced to the one or more catalyst filled tubes (e.g., nickel-based catalyst filled tubes), wherein the catalyst filled tubes are indirectly heated by burning a fuel, and as the stranded remote gas and steam travel along the catalyst filled tubes, methane can be reformed to produce hydrogen and carbon monoxide, and the syngas comprising hydrogen, carbon monoxide, and carbon dioxide can be collected as it exits the catalyst filled tubes.

In an embodiment, the reforming unit can be characterized by a reforming temperature of from about 900° C. to about 1,100° C., alternatively from about 900° C. to about 1,050° C., or alternatively from about 1,000° C. to about 1,100° C. As will be appreciated by one of skill in the art, and with the help of this disclosure, the reforming temperature is dependent on reforming pressure. In an embodiment, the reforming unit can be characterized by a reforming pressure of from about 1 bar to about 10 bars, alternatively from about 1.5 bars to about 8 bars, or alternatively from about 2 bars to about 5 bars. In an embodiment, the reforming unit can be characterized by a reforming pressure of about 1.5 barg. Barg (bar gauge) is a pressure unit for pressure measured above (and with respect to) the atmospheric pressure (which is around 1 bar).

In an embodiment, the syngas can comprise hydrogen, carbon monoxide, carbon dioxide, methane (e.g., unreacted methane, unreformed methane), sulfur-containing compounds (e.g., hydrogen sulfide, carbon sulfide, carbonyl sulfide, carbon disulfide, organic sulfur compounds, etc.), ammonia, optionally cyanides, optionally chlorides, and water.

In an embodiment, the syngas can be characterized by a molar ratio of hydrogen to carbon monoxide of from about 1.7:1 to about 2.5:1, alternatively from about 1.8:1 tea about 2.3:1, or alternatively from about 1.9:1 to about 2.1:1. In an embodiment, the syngas can have a molar ratio of hydrogen to carbon monoxide of about 2:1.

In an embodiment, the syngas can comprise carbon dioxide in an amount of less than about 9 mole % (mol %), alternatively less than about 7 mol %, or alternatively less than about 5 mol %.

In an embodiment, the syngas can comprise methane (e.g., unreacted methane, unreformed methane) in an amount of less than about 2 mol %, alternatively less than about 1 mol %, or alternatively less than about 0.5 mol %.

In an embodiment, the syngas can comprise sulfur-containing compounds in an amount of less than about 0.001 mol % (e.g., about 100 ppmv), alternatively less than about 0.0001 mol %, or alternatively less than about 1 ppmv. As will be appreciated by one of skill in the art, and with the help of this disclosure, a portion of syngas contaminants (e.g., sulfur-containing compounds, chlorides, etc.) can be in a gas state in the syngas, and a portion of the contaminants can be dissolved in the water present in the syngas.

In an embodiment, the syngas can comprise water in an amount of from about 10 mol % to about 30 mol %, alternatively from about 12.5 mol % to about 27.5 mol %, or alternatively from about 15 mol % to about 25 mol %.

In an embodiment, the syngas can have a pressure of from about 1.5 Barg to about 2.5 barg, alternatively from about 1.25 barg to about 2.25 barg, or alternatively about 2 barg.

In an embodiment, the syngas can have a temperature of from about 900° C. to about 1,100° C., alternatively from about 900° C. to about 1,050° C., or alternatively from about 1,000° C. to about 1,100° C. As will be appreciated by one of skill in the art, and with the help of this disclosure, the temperature of the syngas is about the same as the reforming temperature.

Figure 1:
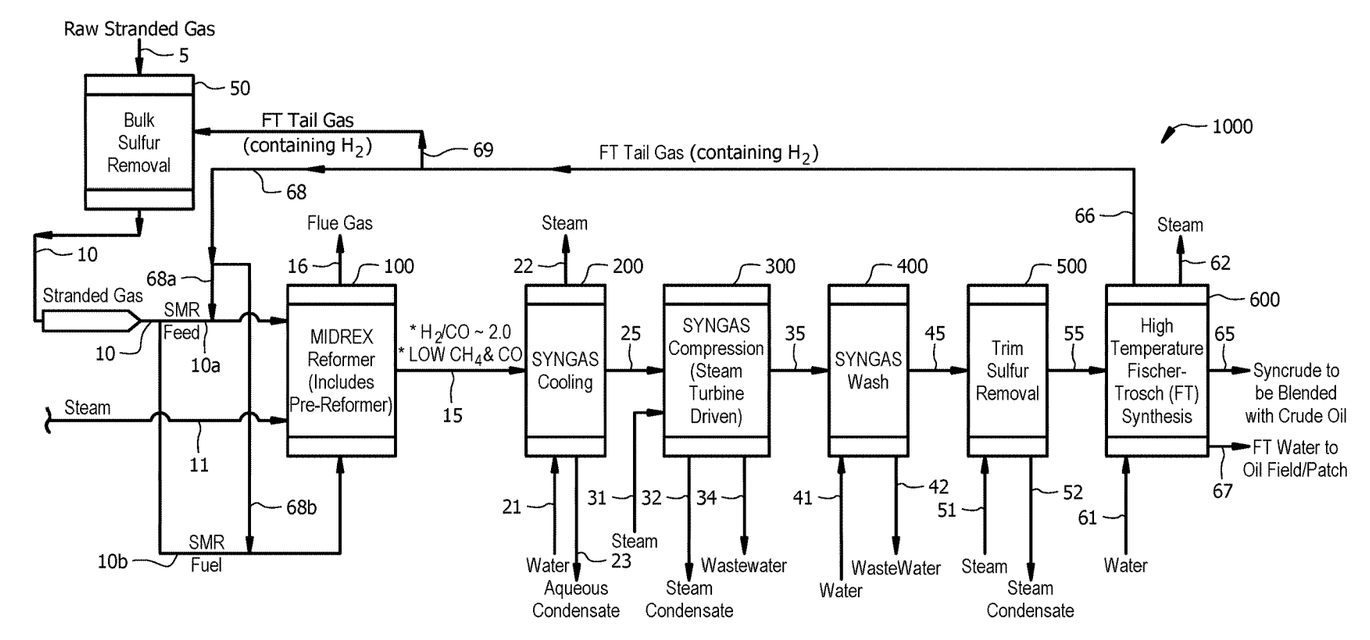
FIG. 1 displays a schematic of a process for processing stranded remote gas by employing a modular system.

In an embodiment, a method of processing stranded remote gas can comprise introducing at least a portion of the syngas to the cooling unit to produce a cooled syngas and an aqueous condensate. In an embodiment, the cooled syngas can have a temperature of from about 40° C. to about 60° C., or alternatively from about 45° C. to about 55° C. Cooling the syngas (e.g., lowering the temperature of the syngas) is a first step in removing water vapors from the syngas, as water will condense easier at lower temperatures. As will be appreciated by one of skill in the art, and with the help of this disclosure, a portion of water (e.g., water vapors) from the syngas could condense in the cooling unit and could be recovered as an aqueous condensate (e.g., aqueous condensate stream 23). The cooling unit can comprise a heat exchanger, wherein water (e.g., cooling water) can be introduced to the heat exchanger to capture a portion of the heat from the syngas, wherein the syngas can be recovered as cooled syngas, and wherein the cooling water can be recovered as steam (e.g., high pressure steam, superheated high pressure steam), which can be recycled as process steam. For example at least a portion of the high pressure steam can be introduced to a compressing unit (e.g., for powering a steam turbine driven compressing unit), and/or a sulfur removal unit (e.g., second sulfur removal unit, trim sulfur removal unit). Additionally or alternatively, steam produced in the cooling unit could be routed to the reformer unit (e.g., reforming unit 100), a compressing unit (e.g., compressing unit 300), and/or a sulfur removal unit (e.g., trim sulfur removal unit 500).

In an embodiment, a method of processing stranded remote gas can comprise introducing at least a portion of the cooled syngas to the compressing unit to produce a compressed syngas. In an embodiment, the compressed syngas can have a pressure of from about 20 barg to about 50 barg, alternatively from about 20 barg to about 30 barg, alternatively from about 30 barg to about 40 barg, or alternatively from about 40 barg to about 50 barg. Compressing the syngas to a higher pressure allows for the water in the syngas to condense and be removed at a higher temperature, as opposed to a lower temperature where the water in the syngas would condense at the syngas pressure prior to compressing the syngas. In an embodiment, the compressing unit can comprise a steam turbine driven compressing unit, wherein at least a portion of the steam produced by the cooling unit can be used for powering the turbine, and a spent steam can be recovered from the compressing unit as a steam condensate (e.g., aqueous condensate), which can be further used as process water (for example, for producing steam). The water in the syngas can be recovered from the compressing unit as process wastewater (e.g., aqueous condensate), wherein at least a portion of the process wastewater can be sent to a wastewater treatment system for disposal. The process wastewater recovered from the compressing unit can comprise a portion of the syngas contaminants (e.g., sulfur-containing compounds, chlorides, etc.) dissolved therein. In an embodiment, the process wastewater recovered from the compressing unit can comprise sour water that is sent to a sour water stripper for further processing. In an embodiment, the process wastewater recovered from the compressing unit can comprise sour water that is used for oil recovery operations, as described in more detail herein, and such use eliminates the need for further treatment of the recovered wastewater.

In an embodiment, the compressed syngas can comprise sulfur-containing compounds in an amount of less than about 0.001 mol % (e.g., about 100 ppmv), alternatively less than about 0.0001 mol %, or alternatively less than about 1 ppmv.

In an embodiment, a method of processing stranded remote gas can comprise introducing at least a portion of the compressed syngas to the washing unit to produce a washed syngas (e.g., ammonia free washed syngas, washed compressed syngas). In an embodiment, the compressed syngas can be washed to further remove syngas contaminants (e.g., ammonia, cyanides, etc.), as ammonia could poison an FT catalyst.

In some embodiments, a portion of the syngas contaminants (e.g., ammonia, cyanides, chlorides, etc.) can be removed using a wet removal system such as a water scrubber (e.g., syngas scrubber). In an embodiment, a method of processing stranded remote gas can comprise introducing at least a portion of the compressed syngas and water to a washing unit (e.g., syngas scrubber) to produce a washed syngas, wherein a portion of the syngas contaminants (e.g., ammonia, cyanides, chlorides, etc.) present in the compressed syngas are removed to yield the washed syngas, wherein the washed syngas comprises the components of the compressed syngas such as carbon monoxide, and hydrogen, and has a reduced concentration of any components that are removed via contact with water in the washing unit (e.g., ammonia, cyanides, chlorides, etc.).

In an embodiment, the washed syngas can be substantially free of ammonia (e.g., ammonia free washed syngas). In an embodiment, the washed syngas can comprise substantially none of the ammonia of the syngas. In an embodiment, the washed syngas can comprise ammonia in an amount of less than about 0.1 ppmv, alternatively less than about 0.01 ppmv, or alternatively less than about 0.001 ppmv.

In an embodiment, the washing unit (e.g., syngas scrubber, water scrubber) can comprise a trayed column for removing a portion of contaminants, such as for example a portion of ammonia, chlorides, and other trace contaminants (e.g., cyanides). Spent water can be recovered from the washing unit as process wastewater, wherein at least a portion of the spent water can be sent to a wastewater treatment system for disposal. The process wastewater recovered from the washing unit can comprise a portion of the syngas contaminants (e.g., ammonia, cyanides, chlorides, etc.) dissolved therein. In an embodiment, the process wastewater recovered from the washing unit can comprise sour water that is sent to a sour water stripper for further processing. In an embodiment, the process wastewater recovered from the washing unit can comprise sour water that is used for oil recovery operations, as described in more detail herein, and such use eliminates the need for further treatment of the recovered wastewater.

In an embodiment, a method of processing stranded remote gas can comprise introducing at least a portion of the washed syngas to the second sulfur removal unit (e.g., trim sulfur removal unit) to produce a purified syngas. In an embodiment, the trim sulfur removal unit can be a sulfur guard bed, wherein the sulfur guard bed can remove traces of sulfur-containing compounds that can be still present in the washed syngas.

In some embodiments, the trim sulfur removal unit can comprise a fixed bed, wherein the fixed bed comprises mixed metal oxides, such as for example zinc oxides (ZnO), copper oxides ($CuO$, $Cu_2O$), nickel oxide (NiO), iron oxides (FeO), manganese oxides ($MnO$, $MnO_2$), and the like, or combinations thereof, therein the mixed metal oxides can be unsupported or supported on supports such as alumina, silica, and the like, or combinations thereof. In an embodiment, the trim sulfur removal unit can comprise a PURASPEC fixed bed, which is commercially available from Johnson Matthey Process Technologies.

In an embodiment, the purified syngas can comprise sulfur in an amount of less than about 10 parts per billion volume (ppbv), alternatively less than about 5 ppbv, or alternatively less than about 1 ppbv. In an embodiment, the purified syngas is substantially sulfur-free, alternatively sulfur-free. As will be appreciated by one of skill in the art, and with the help of this disclosure, sulfur above certain levels could poison a catalyst in the FT unit, and such levels are dependent on the type of catalyst used in the FT unit, the type of FT unit, process conditions for the FT unit, etc.

In an embodiment, a molar ratio of hydrogen to carbon monoxide in the syngas recovered from the reforming unit can be about the same as a molar ratio of hydrogen to carbon monoxide in the purified syngas, as the amount of these two components is not altered in the removal of contaminants of the syngas via processes such as cooling, compressing, aqueous condensate removal, washing and/or scrubbing, trim sulfur removal, etc. That is, as will be appreciated by one of skill in the art, and with the help of this disclosure, contaminant removal procedures do not change the molar ratio of hydrogen to carbon monoxide in the syngas, it only removes contaminants. In an embodiment, the purified syngas can be characterized by a molar ratio of hydrogen to carbon monoxide of from about 1:7:1 to about 2.5:1, alternatively from about 1.8:1 to about 2.3:1, or alternatively from about 1.9:1 to about 2.1:1. In an embodiment, the purified syngas can have a molar ratio of hydrogen to carbon monoxide of about 2:1, which is a typical ratio employed in Fischer-Tropsch reactions.

In an embodiment, a method of processing stranded remote gas can comprise introducing at least a portion of the purified syngas to the FT unit to produce an FT syncrude product, FT water, and FT tail gas, wherein the FT syncrude product comprises FT hydrocarbon liquids.

In an embodiment, the purified syngas can be converted to liquid hydrocarbons (e.g., FT hydrocarbon liquids) via a Fischer-Tropsch (FT) process. The FT process is generally based on a catalytic chemical reaction in which carbon monoxide and hydrogen in the syngas are converted into hydrocarbons of various molecular weights according to the general reaction $(2n+1)H_2 + nCO \rightarrow C_nH_{2n+2} + nH_2O$ (e.g., FT reaction), wherein n is an integer. There are other side reactions taking place in the FT process, among which the water-gas shift (WGS) reaction $CO + H_2O \leftrightarrow H_2 + CO_2$ is predominant. FT process conditions can be selected to achieve a desired hydrocarbon product distribution. Depending on catalyst, temperature, and type of process employed, an FT process can produce a mixture of hydrocarbons ranging from methane to higher molecular weight paraffins, aromatic hydrocarbons, and olefins; as well as small amounts of low molecular weight oxygenates (e.g., alcohol and organic acids). Waxes (e.g., FT waxes comprising longer-chain paraffins with 20 to 40 carbon molecules that are solid at standard conditions) can also be formed in an FT process; however, such waxes can be cracked to shorter, liquid forms inside the FT unit at the FT reaction temperature, and in the presence of the FT water produced in the FT process.

In an embodiment, the FT syncrude product comprises wax and distillates (e.g., FT hydrocarbon liquids). In an embodiment, the FT syncrude comprises FT wax in an amount of less than about 20 wt. %, alternatively less than about 15 wt. %, alternatively less than about 10 wt. %, alternatively less than about 5 wt. %, or alternatively from about 5 wt. % to about 20 wt. %, with the balance of the syncrude being non-waxy liquid hydrocarbons (e.g., FT hydrocarbon liquids).

In an embodiment, the FT unit can comprise any suitable FT reactor, such as for example a tubular reactor, a multitubular reactor, a fixed bed reactor, a multitubular fixed-bed reactor, a fluidized bed reactor, a slurry reactor, a microchannel reactor, and the like, or combinations thereof. The FT reaction is highly exothermic, therefore efficient heat removal is an important feature of the FT unit (e.g., FT reactor). In an embodiment, the FT unit (e.g., FT reactor) can comprise an FT catalyst, wherein the FT catalyst can comprise transition metals, such as iron, cobalt, nickel, ruthenium, etc. The FT process is exothermic, and the FT reaction temperature can be generally controlled by cooling the reactor to achieve the desired FT reaction temperature, for example by using a cooling liquid such as water. In an embodiment, the FT unit can be characterized by an FT reaction temperature of from about 300° C. to about 350° C., alternatively from about 300° C. to about 370° C., alternatively from about 330° C. to about 370° C., or alternatively from about 340° C. to about 360° C. In an embodiment, the FT unit can comprise a microchannel reactor with a cobalt catalyst, a fixed bed reactor with a cobalt catalyst, or combinations thereof.

In an embodiment, a crude oil can be recovered from a wellbore at the wellbore site. In such embodiment, the FT syncrude can be blended with (e.g., added to) the crude oil recovered on site (e.g., on location), wherein the FT syncrude product can be fungible with the crude oil. For purposes of the disclosure herein, the term "fungible" refers to the FT syncrude comprising FT hydrocarbon liquids being substantially similar to the hydrocarbon liquids that are part of the crude oil composition. The FT syncrude does not alter the properties (e.g., physical properties, chemical properties, etc.) of the crude oil in an undesirable manner. A low FT wax content of the FT syncrude (e.g., less than about 5 wt. %) further allows for the FT syncrude to be fungible with the crude oil. Conventional FT processes generally separate a liquid hydrocarbon fraction from waxes, wherein the waxes can be further hydrocracked and converted into liquid hydrocarbons. However, the low wax content of the FT syncrude can allow for the waxes to remain part of the FT syncrude and still render the FT syncrude fungible with the crude oil. In an embodiment, a method of processing stranded remote gas excludes separating the FT syncrude product into fractions (e.g., a liquid hydrocarbon fraction and a wax fraction) prior to blending the FT syncrude product with crude oil. In an embodiment, the crude oil and FT syncrude can be blended or combined to form a miscible liquid suitable for transport via any available means for crude transport (e.g., pipeline, tanker, barge, railcar, overland trailer, etc.).

In some embodiments, the FT syncrude product can be a value added product for the crude oil. Generally, the crude oil can comprise sulfur, which is undesirable and usually has to be removed when the crude oil is further processed. As will be appreciated by one of skill in the art, and with the help of this disclosure, by adding to the crude oil a liquid hydrocarbon product (e.g., FT syncrude) with a very low sulfur content, the overall concentration of sulfur in the crude oil can be decreased. In an embodiment, the FT syncrude can be substantially free of sulfur (e.g., sulfur free FT syncrude). In an embodiment, the sulfur free FT syncrude product can comprise sulfur in an amount of less than about 2 parts per billion (ppb), alternatively less than about 1 ppb, or alternatively less than about 0.5 ppb.

In an embodiment, a method of processing stranded remote gas excludes storing the FT syncrude product on-site for a time period greater than about 8 hours, alternatively greater than about 4 hours, or alternatively greater than about 2 hours, prior to blending the FT syncrude product with the crude oil. The FT syncrude can be added to the crude oil at any point in time between recovering the crude oil from the wellbore and transporting the crude oil from the wellbore site to any suitable location, such that the FT syncrude can become part of the crude oil. The crude oil that contains the FT syncrude can be stored on location as necessary. For example, the crude oil that contains the FT syncrude can be stored in an oil tanker until such tanker is ready (e.g., until the tanker is full, until a certain number of tankers are ready to be transported, etc.) to transport the crude oil from the wellbore site to any suitable location. In some embodiments, the FT syncrude can be added to an oil pipeline transporting the crude oil from the wellbore site to any suitable location. Mixing the FT syncrude with the crude oil produced by the wellbore, at the same wellbore site where the stranded remote gas is recovered from, allows for not having to store the FT syncrude at the wellbore site for extended periods and/or segregate and separately ship the FT syncrude. As will be appreciated by one of skill in the art, and with the help of this disclosure, the FT syncrude can be stored transiently in a vessel as it is recovered from the FT unit, for example in a vessel receiving the FT syncrude as it is being separated from the FT tail gas and FT water.

In an embodiment, at least a portion of the FT water can be introduced to a wellbore for oil recovery operations, e.g., enhanced oil recovery operation to produce the crude oil, for example in wells that have had a decline in production since initially coming on-line. In such embodiment, the oil recovery operations can comprise hydraulic fracturing, water flooding, enhanced oil recovery, steam injection, or combinations thereof.

In an embodiment, the FT water can comprise water and hydrocarbons. In an embodiment, the FT water can comprise hydrocarbons in an amount of less than about 5 volume % (vol. %), alternatively less than about 2.5 vol. %, or alternatively less than about 1 vol. %. Generally, for the FT water to be further used, it would be necessary to remove the hydrocarbons from the water. However, when the FT water is used in an oil recovery operation, the presence of the hydrocarbons in the FT water is acceptable, as the water is used in an environment containing hydrocarbons. In an embodiment, a method of processing stranded remote gas excludes treating the FT water for hydrocarbon removal.

In an embodiment, a portion of the FT water can be introduced to the reforming unit, wherein at least a portion of the hydrocarbons of the FT water can be converted to syngas in the reforming unit. When the FT water is introduced to the reforming unit, the presence of the hydrocarbons in the FT water is acceptable, as the water is used in an environment containing hydrocarbons; the reforming unit also comprises hydrocarbons introduced as part of the stranded remote gas. As will be appreciated by one of skill in the art, and with the help of this disclosure, the hydrocarbons of the FT water can be reformed over a reforming catalyst (e.g., nickel-based catalyst) to produce syngas. In an embodiment, a portion of the FT water can be converted to steam for use in the reforming unit. The FT water converted to steam can be used to saturate with moisture a stranded remote gas feed into the reforming unit.

In an embodiment, an FT tail gas can be recovered from the FT unit. In an embodiment, the FT tail gas can comprise olefins, unreacted syngas, and carbon dioxide, wherein the unreacted syngas can comprise carbon monoxide and hydrogen. Fuel gases like methane, propane and butane, can usually be formed in Fr synthesis (e.g., in the FT unit), and such gases can be recovered as part of the FT tail gas.

In an embodiment, a portion of the FT tail gas can be used as fuel for heating the reforming unit, the pre-reforming unit, and the like, or combinations thereof. In some embodiments, a portion of the FT tail gas can be combined with the fuel used for heating the reforming unit and/or the pre-reforming unit. In other embodiments, a portion of the FT tail gas can be used for desulfurization of raw stranded remote gas.

In an embodiment, at least a portion the FT tail gas and steam can be introduced to the pre-reforming unit to produce hydrogenated hydrocarbons, wherein at least a portion of the olefins of the FT tail gas can react with at least a portion of the hydrogen of the FT tail gas to produce the hydrogenated hydrocarbons. In an embodiment, the pre-reforming unit can comprise any suitable hydrogenation reactor, such as for example a tubular reactor, a multitubular reactor a flow reactor, a plug flow reactor, and the like, or combinations thereof. In an embodiment, the pre-reforming unit can comprise any suitable hydrogenation catalyst, such as for example a nickel-based catalyst, a palladium-based catalyst, a platinum-based catalyst, and the like, or combinations thereof.

In an embodiment, a method of processing stranded remote gas can comprise introducing at least a portion of the hydrogenated hydrocarbons to the reforming unit. In an embodiment, an effluent from the pre-reforming unit can comprise the hydrogenated hydrocarbons, carbon dioxide, carbon monoxide, and any residual unreacted olefins and/or hydrogen. In such embodiment, at least a portion of the effluent from the pre-reforming unit comprising the hydrogenated hydrocarbons can be introduced to the reforming unit. In an embodiment, at least a portion of the hydrogenated hydrocarbons can be converted to syngas in the reforming unit. As will be appreciated by one of skill in the art, and with the help of this disclosure, the hydrogenated hydrocarbons recovered from the pre-reforming unit can be reformed over a reforming catalyst (e.g., nickel-based catalyst) to produce syngas. Further, the carbon dioxide of the FT tail gas can be converted to carbon monoxide in the presence of hydrogen in the reforming unit, as previously described herein.

In some embodiments, at least a portion of the stranded remote gas can be introduced to the pre-reforming unit, along with at least a portion of the FT tail gas, wherein at least a portion of the stranded remote gas and at least a portion of the hydrogenated hydrocarbons produced by hydrogenation of the olefins of the FT tail gas can be communicated from the pre-reforming unit to the reforming unit.

In an embodiment, a method of processing stranded remote gas can comprise one or more of the following: (a) setting up at least one modular system for processing stranded remote gas at a wellbore site, wherein each modular system comprises a first sulfur removal unit (e.g., a bulk sulfur removal unit), a pre-reforming unit, a reforming unit, a cooling unit, a compressing unit, a washing unit, a second sulfur removal unit (e.g., trim sulfur removal unit), and a Fischer-Tropsch (FT) unit, wherein the at least one modular system comprises from 1 to about 4 modular systems (to form a spread or array), and wherein one modular system produces from about 750 barrels/day to about 1,250 barrels/day FT syncrude product; (b) introducing a raw stranded remote gas (e.g., untreated stranded remote gas) to the bulk sulfur removal unit for removal of sulfur from the raw stranded remote gas to produce a stranded remote gas (e.g., treated stranded remote gas), wherein the raw stranded remote gas is recovered at the wellbore site, wherein the raw stranded remote gas comprises methane and small amounts of higher hydrocarbons, carbon dioxide, and sulfur-containing compounds, wherein the raw stranded remote gas can comprise sulfur in an amount of greater than about 100 ppmv, wherein the stranded remote gas comprises methane and small amounts of higher hydrocarbons, carbon dioxide, and sulfur-containing compounds, and wherein the stranded remote gas can comprise sulfur in an amount of from about 5 ppmv to about 100 ppmv; (c) introducing at least a portion of the stranded remote gas and steam to the reforming unit to produce synthesis gas (syngas), wherein the syngas comprises carbon monoxide and hydrogen, wherein the syngas is characterized by a molar ratio of hydrogen to carbon monoxide of from about 1.7:1 to about 2.5:1 (more preferably, about 2:1), wherein none of the sulfur-containing compounds are separated from the stranded remote gas prior to introducing the stranded remote gas to the reforming unit, and wherein the reforming unit comprises a sulfur passivated nickel-based catalyst; (d) introducing at least a portion of the syngas to the cooling unit to produce a cooled syngas and an aqueous condensate; (e) introducing at least a portion of the cooled syngas to the compressing unit to produce a compressed syngas and wastewater (e.g., aqueous condensate); (f) introducing at least a portion of the compressed syngas to the washing unit to produce an ammonia free washed syngas; (g) introducing at least a portion of the ammonia free washed syngas to the trim sulfur removal unit to produce a purified syngas (e.g., having less than about 10 ppbv sulfur), wherein the trim sulfur removal unit can comprise a PURASPEC fixed bed; (h) introducing at least a portion of the purified syngas to the FT unit to produce an FT syncrude product, FT water, and FT tail gas, wherein the FT syncrude product comprises FT hydrocarbon liquids, wherein the FT syncrude product comprises FT wax in an amount of less than about 5 wt. %, wherein the FT water comprises water and hydrocarbons, and wherein the FT unit can be characterized by an FT reaction temperature of from about 300° C. to about 350° C.; (i) introducing at least a portion of the FT water to a wellbore for oil recovery, wherein the oil recovery can comprise hydraulic fracturing, water flooding, enhanced oil recovery, steam injection, and the like, or combinations thereof; (j) recovering a crude oil from the wellbore; (k) blending the FT syncrude product with the crude oil to form a blended product, wherein the FT syncrude product is fungible with the crude oil, and subsequently transporting the blended product; (l) introducing at least a portion of the FT tail gas and steam to the pre-reforming unit to produce hydrogenated hydrocarbons, wherein the FT tail gas comprises olefins, unreacted syngas, and carbon dioxide, wherein the unreacted syngas comprises carbon monoxide and hydrogen, and wherein at least a portion of the olefins react with at least a portion of the hydrogen to produce the hydrogenated hydrocarbons; (m) converting a portion of the FT water to steam for use in the reforming unit and/or pre-reforming unit, wherein at least a portion of the hydrocarbons of the FT water can be reformed over the sulfur passivated nickel-based catalyst in the reforming unit to produce syngas; and (n) introducing at least a portion of the hydrogenated hydrocarbons to the reforming unit, wherein least a portion of the hydrogenated hydrocarbons can be reformed over the sulfur passivated nickel-based catalyst to produce syngas. In an embodiment, at least a portion of the FT tail gas containing hydrocarbons, $H_2$, CO, and $CO_2$ can be introduced to the reforming unit, wherein the FT tail gas can be utilized as fuel in the reforming unit. In an embodiment, a portion of the FT tail gas containing $H_2$ can be introduced to the bulk sulfur removal unit (e.g., raw stranded remote gas sulfur removal unit).

Referring to the embodiment of FIG. 1, a modular system for processing stranded remote gas 1000 is disclosed. The modular system for processing stranded remote gas 1000 generally comprises a bulk sulfur removal unit 50, a reforming unit 100; a cooling unit 200; a compressing unit 300; a washing unit 400; a trim sulfur removal unit 500; and an FT unit 600. As will be appreciated by one of skill in the art, and with the help of this disclosure, components of the modular system for processing stranded remote gas can be in fluid communication with each other through any suitable conduits (e.g., pipes, streams, etc.).

In an embodiment, a method of processing stranded remote gas can comprise one or more of the following: (a) setting up at least one modular system for processing stranded remote gas at a wellbore site, wherein each modular system comprises a bulk sulfur removal unit 50, a reforming unit 100 (which may include both a reformer and a pre-reformer), a cooling unit 200, a compressing unit 300, a washing unit 400, a trim sulfur removal unit 500, and a Fischer-Tropsch (FT) unit 600, wherein the at least one modular system comprises from 1 to about 4 modular systems, and wherein one modular system produces from about 750 barrels/day to about 1,250 barrels/day FT syncrude product via stream 65; (b) introducing a raw stranded remote gas stream 5 to the bulk sulfur removal unit 50 for removal of sulfur from the raw stranded remote gas to produce a stranded remote gas stream 10, wherein the raw stranded remote gas stream 5 can be recovered at the wellbore site, wherein the raw stranded remote gas comprises methane and small amounts of higher hydrocarbons, carbon dioxide, and sulfur-containing compounds, wherein the raw stranded remote gas can comprise sulfur in an amount of greater than about 100 ppmv, wherein the stranded remote gas comprises methane and small amounts of higher hydrocarbons, carbon dioxide, and sulfur-containing compounds, and wherein the stranded remote gas can comprise sulfur in an amount of less than about 100 ppmv; (c) introducing a stranded remote gas stream 10a and a steam stream 11 to the reforming unit 100 to produce a synthesis gas (syngas) stream 15, wherein the stranded remote gas stream 10a comprises a portion of the stranded remote gas stream 10, wherein the syngas comprises carbon monoxide and hydrogen, wherein the syngas can be characterized by a molar ratio of hydrogen to carbon monoxide of from about 1.7:1 to about 2.5:1, wherein none of the sulfur-containing compounds are separated from the stranded remote gas prior to introducing the stranded remote gas to the reforming unit, wherein the reforming unit 100 comprises a sulfur passivated nickel-based catalyst, wherein a stranded remote gas stream 10b can be used as fuel to heat the reforming unit 100, wherein the stranded remote gas stream 10b comprises a portion of the stranded remote gas stream 10, wherein a flue gas stream 16 can be emitted from the reforming unit, and wherein the flue gas comprises fuel combustion products; (d) introducing at least a portion of the syngas stream 15 to the cooling unit 200 (e.g., syngas cooling unit) to produce a cooled syngas stream 25 and an aqueous condensate stream 23, wherein a cooling water stream 21 can cool the syngas and can produce a steam stream 22; (e) introducing at least a portion of the cooled syngas stream 25 to the compressing unit 300 to produce a compressed syngas stream 35 and a wastewater stream 34, wherein the compressing unit 300 can be a steam turbine driven compressing unit, wherein a steam stream 31 can power the steam turbine, and wherein a spent steam can condense and be recovered as a steam condensate stream 32; (f) introducing at least a portion of the compressed syngas stream 35 and a water stream 41 to the washing unit 400 to produce a washed syngas stream 45 (e.g., an ammonia free washed syngas stream), and a wastewater stream 42; (g) introducing at least a portion of the washed syngas stream 45 to the trim sulfur removal unit 500 to produce a purified syngas stream 55, wherein a steam stream 51 can be introduced to the trim sulfur removal unit 500, and wherein the steam can condense and be recovered as a steam condensate stream 52; (h) introducing at least a portion of the purified syngas stream 55 to the FT unit 600 to produce an FT syncrude product stream 65, an FT water stream 67, and an FT tail gas stream 66, wherein the FT syncrude product comprises FT hydrocarbon liquids, wherein the FT syncrude product comprises FT wax in an amount of less than about 5 wt. %, wherein the FT water comprises water and hydrocarbons, wherein the FT unit 600 can be characterized by an FT reaction temperature of from about 300° C. to about 350° C., wherein a water stream 61 can be used to cool the FT unit 600, and wherein at least a portion of the water stream 61 can convert into steam and can be recovered as a steam stream 62; (i) introducing at least a portion of the FT water stream 67 to a wellbore for oil recovery, wherein the oil recovery can comprise hydraulic fracturing, water flooding, enhanced oil recovery, steam injection, and the like, or combinations thereof; (j) recovering a crude oil from the wellbore; (k) blending the FT syncrude product stream 65 with the crude oil to form a blend product, wherein the FT syncrude product is fungible with the crude oil, and wherein the blend product is transported away from the wellsite; (l) introducing a portion of the FT tail gas stream 66 (e.g., FT tail gas stream 68a, wherein the FT tail gas stream 68a comprises a portion of the FT tail gas stream 68, and wherein the FT tail gas stream 68 comprises a portion of the FT tail gas stream 66) and a steam stream to the pre-reforming unit to produce hydrogenated hydrocarbons, wherein the FT tail gas comprises olefins, unreacted syngas, and carbon dioxide, wherein the unreacted syngas comprises carbon monoxide and hydrogen, and wherein at least a portion of the olefins react with at least a portion of the hydrogen to produce the hydrogenated hydrocarbons; (m) converting a portion of the FT water stream 67 to steam for use in the reforming unit 100 and/or pre-reforming unit, wherein at least a portion of the hydrocarbons of the FT water can be reformed over the sulfur passivated nickel-based catalyst in the reforming unit 100 to produce syngas; and (n) introducing at least a portion of the hydrogenated hydrocarbons to the reforming unit 100, wherein at least a portion of the hydrogenated hydrocarbons can be reformed over the sulfur passivated nickel-based catalyst to produce syngas. In an embodiment, at least a portion of the steam stream 62 can be recycled to the reforming unit 100 and/or pre-reforming unit via steam stream 11. In an embodiment, a portion of the FT tail gas stream 66 (e.g., FT tail gas stream 68b, wherein the FT tail gas stream 68b comprises a portion of the FT tail gas stream 68, and wherein the FT tail gas stream 68 comprises a portion of the FT tail gas stream 66) can be used as fuel for heating the reforming unit 100 and/or pre-reforming unit, for example via fuel stream 10b (e.g., stranded remote gas stream 10b). In an embodiment, a portion of the FT tail gas stream 66 (e.g., FT tail gas stream 69, wherein the FT tail gas stream 69 comprises a portion of the FT tail gas stream 68, and wherein the FT tail gas stream 68 comprises a portion of the FT tail gas stream 66) can be introduced to the bulk sulfur removal unit 50 (e.g., raw stranded remote gas sulfur removal unit). In an embodiment, all or a portion of wastewater stream 34 and/or 42 is combined with the FT water stream 67 and introduced to a wellbore for enhanced oil recovery procedures. In an embodiment, the stranded gas that is processed and the crude that is blended with the FT syncrude are produced from at least one common wellsite, for example a common wellhead that produces both crude oil and associated or residual stranded gas. In an embodiment, the stranded gas that is processed and the crude that is blended with the FT syncrude are produced from a plurality of wellsites in relatively close geographical proximity, for example wellheads located within a 5, 4, 3, 2, 1, 0.75. 0.5, 0.25, or 0.1 mile radius of the modular system as described herein.

In an embodiment, a method of processing stranded remote gas as disclosed herein can advantageously display improvements in one or more method characteristics when compared to conventional methods of processing stranded remote gas. Conventional methods of processing stranded remote gas produced at wellsites generally flare the stranded gas, thereby wasting a valuable resource and polluting the environment. The method of processing stranded remote gas as disclosed herein can advantageously avoid flaring the stranded remote gas by converting the stranded remote gas to useful hydrocarbon liquids (e.g., FT syncrude product). The method for producing syngas as disclosed herein can advantageously avoid treatment of a stranded remote gas to remove sulfur containing compounds and/or $CO_2$ prior to converting the stranded gas to other useful products (e.g., FT syncrude).

In an embodiment, a method of processing stranded remote gas as disclosed herein can advantageously convert stranded remote gas to hydrocarbon liquids that can be blended with crude oil for ease of storage and/or transport. The FT reaction can be advantageously conducted at a higher temperature than conventionally employed to produce more distillate (e.g., FT hydrocarbon liquids) and less wax (e.g., FT wax) such that the FT syncrude product (e.g., blended FT liquid product) is fungible (e.g., miscible) with the crude oil.

In an embodiment, a method of processing stranded remote gas as disclosed herein can advantageously route the FT water produced in the FT unit to the oil operations, such as for example fracking, thus avoiding the use of fresh or raw water and the need for treating the FT water.

In an embodiment, a method of processing stranded remote gas as disclosed herein can advantageously use the FT water and/or the aqueous condensate from syngas cooling (e.g., light condensate) for moisturizing a stranded remote gas feed for the reforming unit to remove heavy hydrocarbons, if required. The FT tail gas feed that contains unconverted CO and $H_2$, as well as $CO_2$ and light hydrocarbons, can be advantageously processed in the pre-reforming unit (e.g., pre-reformer).

In an embodiment, a method of processing stranded remote gas as disclosed herein can advantageously use a modular system for about 1,000 barrels per day liquids production (e.g., FT syncrude product) that can be installed at the site (e.g., wellbore site) using minimum field labor. A modular design of a system for processing stranded remote gas can advantageously enable use in smaller fields (e.g., oil fields, pad sites, etc.), for example oil fields with existing gas production and crude oil handling facilities. The method of processing stranded remote gas as disclosed herein can advantageously use an already existing flare system at the wellbore site for startup, shut down, and/or emergency situations.

In an embodiment, a method of processing stranded remote gas as disclosed herein can advantageously avoid storage of FT products because crude oil facilities already exist at the wellbore site. Additional advantages of the methods of processing stranded remote gas as disclosed herein can be apparent to one of skill in the art viewing this disclosure.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggested to one of ordinary skill in the art without departing from the spirit of the present invention or the scope of the appended claims.

Additional Disclosure

A first embodiment, which is a method of processing stranded remote gas comprising (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1; (b) introducing at least a portion of the syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C.; and (c) blending the FT syncrude product with crude oil for storage and/or transport.

A second embodiment, which is the method of the first embodiment, wherein at least a portion of the FT water is introduced to a wellbore for oil recovery.

A third embodiment, which is the method of the second embodiment, wherein the oil recovery comprises hydraulic fracturing, water flooding, enhanced oil recovery, steam injection, or combinations thereof.

A fourth embodiment, which is the method of any one of the first through the third embodiments, wherein the FT water comprises water and hydrocarbons, and wherein the method excludes treating the FT water for hydrocarbon removal.

A fifth embodiment, which is the method of the fourth embodiment, wherein a portion of the FT water is used for producing the steam that is introduced to the reforming unit, and wherein at least a portion of the hydrocarbons of the FT water is converted to syngas in the reforming unit.

A sixth embodiment, which is the method of any one of the first through the fifth embodiments, wherein a molar ratio of carbon dioxide to carbon in hydrocarbons of total feed streams to the reforming unit is from about 0.4:1 to about 0.8:1.

A seventh embodiment, which is the method of any one of the first through the sixth embodiments excluding separating at least a portion of the carbon dioxide from the stranded remote gas prior to introducing the stranded remote gas to the reforming unit.

An eighth embodiment, which is the method of any one of the first through the seventh embodiments, wherein the sulfur-containing compounds comprise hydrogen sulfide.

A ninth embodiment, which is the method of any one of the first through the eighth embodiments, wherein a molar ratio of steam to carbon in hydrocarbons of total feed streams to the reforming unit is from about 0.65:1 to about 2.0:1.

A tenth embodiment, which is the method of any one of the first through the ninth embodiments, wherein the reforming unit comprises a nickel-based catalyst and/or a sulfur passivated nickel-based catalyst.

An eleventh embodiment, which is the method of any one of the first through the tenth embodiments, wherein the FT syncrude product is miscible with crude oil.

A twelfth embodiment, which is the method of any one of the first through the eleventh embodiments, wherein the FT syncrude product is a value added product for crude oil.

A thirteenth embodiment, which is the method of any one of the first through the twelfth embodiments, wherein the FT syncrude product comprises sulfur in an amount of less than about 2 ppb.

A fourteenth embodiment, which is the method of the eleventh embodiment excluding storing the FT syncrude product on-site for a time period greater than about 8 hours, prior to blending the FT syncrude product with the crude oil.

A fifteenth embodiment, which is the method of any one of the first through the fourteenth embodiments excluding separating the FT syncrude product into fractions prior to blending the FT syncrude product with crude oil.

A sixteenth embodiment, which is the method of any one of the first through the fifteenth embodiments, wherein a portion of the FT tail gas is used as fuel for heating the reforming unit, a pre-reforming unit, or combinations thereof.

A seventeenth embodiment, which is the method of any one of the first through the sixteenth embodiments, wherein the FT tail gas comprises olefins, unreacted syngas, and carbon dioxide, wherein the unreacted syngas comprises carbon monoxide and hydrogen, wherein at least a portion of the FT tail gas and steam are introduced to a pre-reforming unit to produce hydrogenated hydrocarbons, wherein at least a portion of the olefins react with at least a portion of the hydrogen to produce the hydrogenated hydrocarbons.

An eighteenth embodiment, which is the method of the seventeenth embodiment, wherein at least a portion of the hydrogenated hydrocarbons are introduced to the reforming unit, and wherein at least a portion of the hydrogenated hydrocarbons is converted to syngas in the reforming unit.

A nineteenth embodiment, which is the method of any one of the first through the eighteenth embodiments, wherein at least a portion of the stranded remote gas is introduced to the pre-reforming unit, and wherein at least a portion of the stranded remote gas and at least a portion of the hydrogenated hydrocarbons are communicated from the pre-reforming unit to the reforming unit.

A twentieth embodiment, which is the method of any one of the first through the nineteenth embodiments further comprising setting up at least one modular system for processing the stranded remote gas at a wellbore site, wherein each modular system comprises a pre-reforming unit, a reforming unit, and an FT unit.

A twenty-first embodiment, which is a method of processing stranded remote gas comprising (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1; (h) introducing at least a portion of the syngas to a Fischer-Tropsch (FT) unit to produce an FT syncrude product, FT water, and FT tail gas, wherein the FT syncrude product comprises FT hydrocarbon liquids, wherein the FT syncrude product comprises wax in an amount of less than about 5 wt. %, and wherein the FT unit is characterized by an FT reaction temperature of from about 300° C. to about 350° C.; and (c) introducing at least a portion of the FT water to a wellbore for enhanced oil recovery.

A twenty-second embodiment, which is the method of the twenty-first embodiment further comprising setting up at least one modular system for processing the stranded remote gas at a wellbore site, wherein each modular system comprises a pre-reforming unit, a reforming unit, and an FT unit.

A twenty-third embodiment, which is a method of processing stranded remote gas comprising (a) setting up at least one modular system for processing stranded remote gas at a wellbore site, wherein each modular system comprises a pre-reforming unit, a reforming unit, and a Fischer-Tropsch (FT) unit; (b) introducing stranded remote gas and steam to the reforming unit to produce synthesis gas (syngas), wherein the stranded remote gas is recovered at the wellbore site, wherein the stranded remote gas comprises methane, carbon dioxide, and sulfur-containing compounds, and wherein the syngas is characterized by a molar ratio of hydrogen to carbon monoxide of from about 1.7:1 to about 2.5:1; (c) introducing at least a portion of the syngas to the FT unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C.; (d) introducing at least a portion of the FT water to a wellbore for oil recovery; (e) recovering a crude oil from the wellbore; (f) blending the FT syncrude product with the crude oil, wherein the FT syncrude product is miscible with the crude oil; (g) introducing at least a portion of the FT tail gas and steam to the pre-reforming unit to produce hydrogenated hydrocarbons, wherein the FT tail gas comprises olefins, unreacted syngas, and carbon dioxide, wherein the unreacted syngas comprises carbon monoxide and hydrogen, and wherein at least a portion of the olefins react with at least a portion of the hydrogen to produce the hydrogenated hydrocarbons; and (h) introducing at least a portion of the hydrogenated hydrocarbons to the reforming unit.

A twenty-fourth embodiment, which is the method of the twenty-third embodiment, wherein one modular system produces from about 750 barrels/day to about 1,250 barrels/day FT syncrude product.

A twenty-fifth embodiment, which is the method of any one of the twenty-third and the twenty-fourth embodiments, wherein the at least one modular system comprises from 1 to about 4 modular systems.

A twenty-sixth embodiment, which is the method of any one of the twenty-third through the twenty-fifth embodiments, wherein one or more modular systems of the at least one modular system are disassembled into individual units when the modular system produces less than about 750 barrels/day FT syncrude product.

A twenty-seventh embodiment, which is the method of any one of the twenty-third through the twenty-sixth embodiments, wherein individual units of one or more disassembled modular systems are moved to and set up at another wellbore site for processing the stranded remote gas recovered at the another wellbore site.

A twenty-eighth embodiment, which is a method of processing stranded remote gas comprising (a) introducing raw stranded remote gas to a bulk sulfur removal unit to produce stranded remote gas, wherein the stranded remote gas comprises methane, carbon dioxide, and sulfur-containing compounds, and wherein the stranded remote gas comprises sulfur in an amount of less than about 100 ppmv; (b) introducing at least a portion of the stranded remote gas and steam to a reforming unit to produce synthesis gas (syngas), wherein the syngas is characterized by a molar ratio of hydrogen to carbon monoxide of from about 1.7:1 to about 2.5:1; (c) introducing at least a portion of the syngas to a cooling unit to produce a cooled syngas; (d) introducing at least a portion of the cooled syngas to a compressing unit to produce a compressed syngas; (e) introducing at least a portion of the compressed syngas to a washing unit to produce a washed syngas; (f) introducing at least a portion of the washed syngas to a trim sulfur removal unit to produce a purified syngas; (g) introducing at least a portion of the purified syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than about 5 wt. %, and wherein the FT unit is characterized by an FT reaction temperature of from about 300° C. to about 350° C.; (h) introducing at least a portion of the FT water to a wellbore for oil recovery; and (i) blending the FT syncrude product with crude oil produced for storage and/or transport.

A twenty-ninth embodiment, which is the method of the twenty-eighth embodiment further comprising setting up at least one modular system for processing the stranded remote gas at a wellbore site, wherein each modular system comprises a pre-reforming unit, a reforming unit, and an FT unit.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of processing stranded remote gas comprising:
    (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1;
    (b) introducing at least a portion of the syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than 5 wt. %, and wherein the FT unit is characterized by an FT reaction temperature of from about 300° C. to about 350° C.; and
    (c) without separating the FT syncrude product into fractions, blending the FT syncrude product with crude oil from a wellbore for storage and/or transport.

2. The method of claim 1, wherein at least a portion of the FT water is introduced to a wellbore for oil recovery.

3. The method of claim 2, wherein the oil recovery comprises hydraulic fracturing, water flooding, enhanced oil recovery, steam injection, or combinations thereof.

4. The method of claim 1, wherein the FT water comprises water and hydrocarbons, and wherein the method excludes treating the FT water for hydrocarbon removal.

5. The method of claim 4, wherein a portion of the FT water is used for producing the steam that is introduced to the reforming unit, and wherein at least a portion of the hydrocarbons of the FT water is converted to syngas in the reforming unit.

6. The method of claim 1, wherein a molar ratio of carbon dioxide to carbon in hydrocarbons of total feed streams to the reforming unit is from about 0.4:1 to about 0.8:1.

7. The method of claim 1 excluding separating at least a portion of the carbon dioxide from the stranded remote gas prior to introducing the stranded remote gas to the reforming unit.

8. The method of claim 1, wherein the sulfur-containing compounds comprise hydrogen sulfide.

9. The method of claim 1, wherein a molar ratio of steam to carbon in hydrocarbons of total feed streams to the reforming unit is from about 0.65:1 to about 2.0:1.

10. The method of claim 1, wherein the reforming unit comprises a nickel-based catalyst and/or a sulfur passivated nickel-based catalyst.

11. The method of claim 1, wherein the FT syncrude product is miscible with the crude oil.

12. The method of claim 1, wherein the FT syncrude product is a value added product for crude oil.

13. The method of claim 1, wherein the FT syncrude product comprises sulfur in an amount of less than about 2 ppb.

14. The method of claim 11 excluding storing the FT syncrude product on-site for a time period greater than about 8 hours, prior to blending the FT syncrude product with the crude oil.

15. The method of claim 1 excluding separating the FT syncrude product into fractions prior to blending the FT syncrude product with crude oil.

16. The method of claim 1, wherein a portion of the FT tail gas is used as fuel for heating the reforming unit, a pre-reforming unit, or combinations thereof.

17. The method of claim 1, wherein the FT tail gas comprises olefins, unreacted syngas, and carbon dioxide, wherein the unreacted syngas comprises carbon monoxide and hydrogen, wherein at least a portion of the FT tail gas and steam are introduced to a pre-reforming unit to produce hydrogenated hydrocarbons, wherein at least a portion of the olefins react with at least a portion of the hydrogen to produce the hydrogenated hydrocarbons.

18. The method of claim 17, wherein at least a portion of the hydrogenated hydrocarbons are introduced to the reforming unit, and wherein at least a portion of the hydrogenated hydrocarbons is converted to syngas in the reforming unit.

19. The method of claim 17, wherein at least a portion of the stranded remote gas is introduced to the pre-reforming unit, and wherein at least a portion of the stranded remote gas and at least a portion of the hydrogenated hydrocarbons are communicated from the pre-reforming unit to the reforming unit.

20. The method of claim 1, further comprising setting up at least one modular system for processing the stranded remote gas at a wellbore site, wherein each modular system comprises a pre-reforming unit, a reforming unit, and an FT unit.

21. A method of processing stranded remote gas comprising:
    (a) introducing stranded remote gas and steam to a reforming unit to produce synthesis gas (syngas), wherein the stranded remote gas comprises methane, carbon dioxide, and sulfur-containing compounds, and wherein the syngas is characterized by a molar ratio of hydrogen to carbon monoxide of from about 1.7:1 to about 2.5:1;

(b) introducing at least a portion of the syngas to a Fischer-Tropsch (FT) unit to produce an FT syncrude product, FT water, and FT tail gas, wherein the FT syncrude product comprises FT hydrocarbon liquids, wherein, without separating the FT syncrude product into fractions, the FT syncrude product comprises FT wax in an amount of less than 5 wt. %, and wherein the FT unit is characterized by an FT reaction temperature of from about 300° C. to about 350° C.; and (c) introducing at least a portion of the FT water to a wellbore for enhanced oil recovery.

22. The method of claim 21, further comprising setting up at least one modular system for processing the stranded remote gas at a wellbore site, wherein each modular system comprises a pre-reforming unit, a reforming unit, and an FT unit.

23. A method of processing stranded remote gas comprising:

(a) setting up at least one modular system for processing stranded remote gas at a wellbore site, wherein each modular system comprises a pre-reforming unit, a reforming unit, and a Fischer-Tropsch (FT) unit;

(b) introducing stranded remote gas and steam to the reforming unit to produce synthesis gas (syngas), wherein the stranded remote gas is recovered at the wellbore site, wherein the stranded remote gas comprises methane, carbon dioxide, and sulfur-containing compounds, and wherein the syngas is characterized by a molar ratio of hydrogen to carbon monoxide of from about 1.7:1 to about 2.5:1;

(c) introducing at least a portion of the syngas to the FT unit to produce an FT syncrude product, FT water, and FT tail gas, wherein the FT syncrude product comprises FT hydrocarbon liquids, wherein the FT syncrude product comprises FT wax in an amount of less than 5 wt. %, and wherein the FT unit is characterized by an FT reaction temperature of from about 300° C. to about 350° C.;

(d) introducing at least a portion of the FT water to a wellbore for oil recovery;

(e) recovering a crude oil from the wellbore;

(f) without separating the FT syncrude product into fractions, blending the FT syncrude product with the crude oil from the wellbore, wherein the FT syncrude product is miscible with the crude oil;

(g) introducing at least a portion of the FT tail gas and steam to the pre-reforming unit to produce hydrogenated hydrocarbons, wherein the FT tail gas comprises olefins, unreacted syngas, and carbon dioxide, wherein the unreacted syngas comprises carbon monoxide and hydrogen, and wherein at least a portion of the olefins react with at least a portion of the hydrogen to produce the hydrogenated hydrocarbons; and (h) introducing at least a portion of the hydrogenated hydrocarbons to the reforming unit.

24. The method of claim 23, wherein one modular system produces from about 750 barrels/day to about 1,250 barrels/day FT syncrude product.

25. The method of claim 23, wherein the at least one modular system comprises from 1 to about 4 modular systems.

26. The method of claim 23, wherein one or more modular systems of the at least one modular system are disassembled into individual units when the modular system produces less than about 750 barrels/day FT syncrude product.

27. The method of claim 23, wherein individual units of one or more disassembled modular systems are moved to and set up at another wellbore site for processing the stranded remote gas recovered at the another wellbore site.

28. A method of processing stranded remote gas comprising:

(a) introducing raw stranded remote gas to a bulk sulfur removal unit to produce stranded remote gas, wherein the stranded remote gas comprises methane, carbon dioxide, and sulfur-containing compounds, and wherein the stranded remote gas comprises sulfur in an amount of less than about 100 ppmv;

(b) introducing at least a portion of the stranded remote gas and steam to a reforming unit to produce synthesis gas (syngas), wherein the syngas is characterized by a molar ratio of hydrogen to carbon monoxide of from about 1.7:1 to about 2.5:1;

(c) introducing at least a portion of the syngas to a cooling unit to produce a cooled syngas;

(d) introducing at least a portion of the cooled syngas to a compressing unit to produce a compressed syngas;

(e) introducing at least a portion of the compressed syngas to a washing unit to produce a washed syngas;

(f) introducing at least a portion of the washed syngas to a trim sulfur removal unit to produce a purified syngas;

(g) introducing at least a portion of the purified syngas to a Fischer-Tropsch (FT) unit to produce an FT syncrude product, FT water, and FT tail gas, wherein the FT syncrude product comprises FT hydrocarbon liquids, wherein the FT syncrude product comprises FT wax in an amount of less than 5 wt. %, and wherein the FT unit is characterized by an FT reaction temperature of from about 300° C. to about 350° C.;

(h) introducing at least a portion of the FT water to a wellbore for oil recovery; and (i) without separating the FT syncrude product into fractions, blending the FT syncrude product with crude oil from the wellbore produced for storage and/or transport.

29. The method of claim 28, further comprising setting up at least one modular system for processing the stranded remote gas at a wellbore site, wherein each modular system comprises a pre-reforming unit, a reforming unit, and an FT unit.

* * * * *